United States Patent [19]
Psomas

[11] Patent Number: 5,419,663
[45] Date of Patent: May 30, 1995

[54] DUST GUARD

[76] Inventor: Sotere Z. Psomas, 2020 NE. 135 St #807, N. Miami, Fla. 33181

[21] Appl. No.: 767,867

[22] Filed: Nov. 22, 1991

[51] Int. Cl.$^6$ .............................................. B23B 45/00
[52] U.S. Cl. ...................................................... 408/67
[58] Field of Search ................................ 408/67, 72 R

[56] References Cited

U.S. PATENT DOCUMENTS

| | | | |
|---|---|---|---|
| 3,339,435 | 9/1967 | Heitz | 408/67 |
| 3,936,213 | 2/1976 | Kappel | 408/67 |
| 4,848,980 | 7/1989 | Broussard | 408/67 |
| 4,921,375 | 5/1990 | Famulari | 408/67 |
| 4,955,984 | 9/1990 | Cuevas | 408/67 |
| 5,292,210 | 3/1994 | Nowick | 408/67 |

FOREIGN PATENT DOCUMENTS

| | | | |
|---|---|---|---|
| 1334366 | 10/1973 | United Kingdom | 408/67 |
| 2211117 | 6/1989 | United Kingdom | 408/67 |

Primary Examiner—Steven C. Bishop
Attorney, Agent, or Firm—Alvin S. Blum

[57] ABSTRACT

A dust guard fits onto the stationary housing of a portable electric drill with a resilient annular terminal portion. An elongate, axially compressible, elastic cylindrical body portion extends from the terminal portion, surrounding the drill bit and forming a chamber to receive debris and dust from the drilling process. The free end of the body portion is provided with a resilient, non-marring annular end piece for engaging the surface of the workpiece being drilled. As the drill bit penetrates the workpiece, the end piece is forced against the body portion, causing it to elastically shorten. The terminal portion 5 has external screw threads 9, and adapters with mating screw threads are provided. These adapters 6, 12, 13, 14 and 15 have progressively greater inside diameters for engaging drill housings having greater diameters than those that would fit the terminal portion 5.

2 Claims, 1 Drawing Sheet

DUST GUARD

BACKGROUND OF THE INVENTION

This invention is directed to debris catching guards for machine tools, and more particularly to a device attachable to a portable drill to contain residue of the drilling operation.

When drilling through many materials, the dust, chips, and debris resulting from the drilling operation may contaminate the workplace and the worker. U.S. Pat. No. 4,955,984 issued Sep. 11, 1990 to Cuevas discusses the prior art of debris catchers for portable drills. The prior art devices are not readily adapted to the very many different sizes of portable drills in use. Consequently, it has not been commercially acceptable to market a debris catcher of the prior art.

SUMMARY OF THE INVENTION

It is accordingly an object of the invention to provide a dust guard for readily removably attaching to a variety of portable electric drills having different size housings. It is another object that the guard readily and resiliently engage the workpiece without marring the workpiece. It is yet another object that the guard resiliently adjusts for length of drill bit and depth of hole.

The dust guard of the invention comprises a cylindrical device having a soft plastic front end for engaging the workpiece surface, a resilient elongate intermediate portion capable of readily compressing as the front end is forced against the workpiece as the drill penetrates, and a rear portion arranged for attachment to the stationary drill housing behind the chuck. Threaded adapters are provided to adapt the rear portion to engage housings of different diameters.

These and other objects, advantages and features of the invention will become more apparent when the detailed description is considered in conjunction with the drawing.

DETAILED DESCRIPTION OF PREFERRED EMBODIMENT

Figure 1:
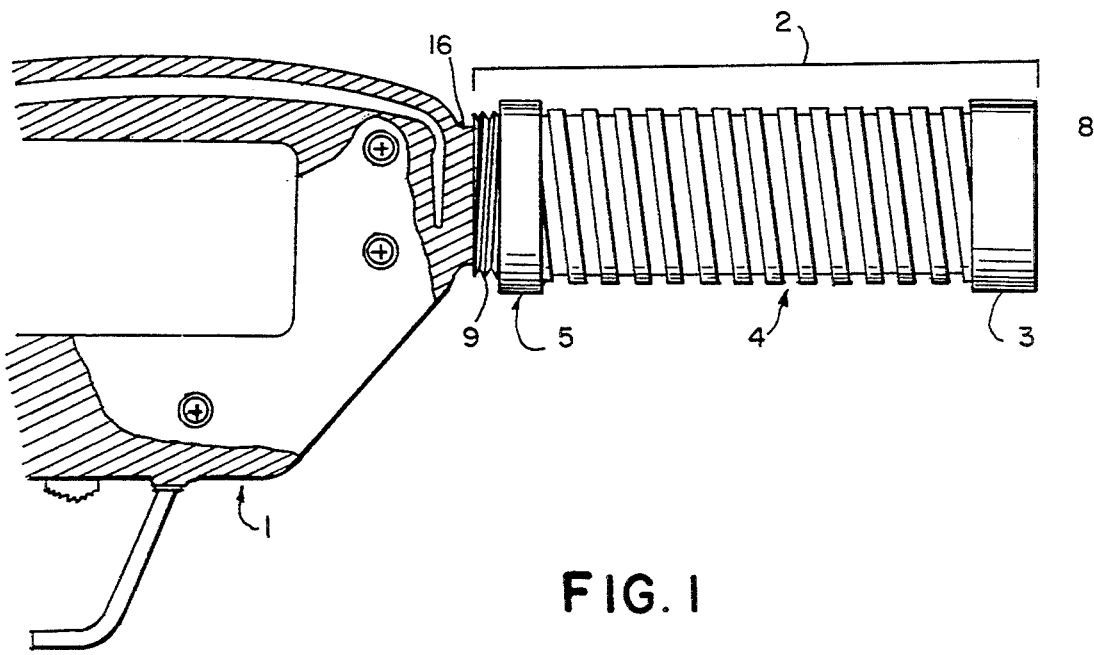
FIG. 1 shows a side elevation view of the invention in place on a drill.
Figure 2:
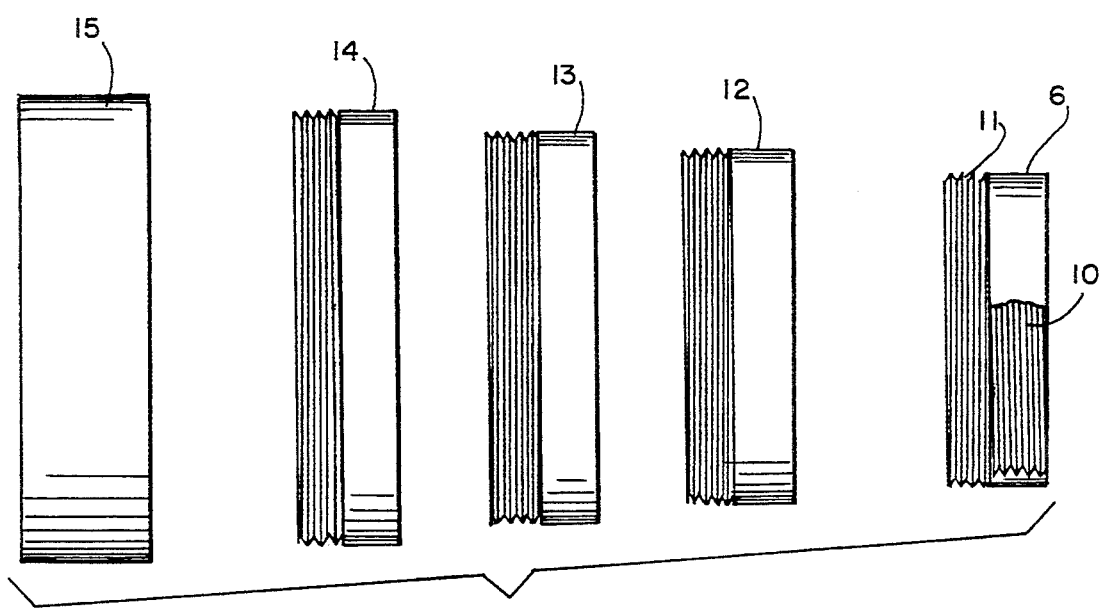
FIG. 2 shows a set of adapters for adapting the dust guard to fit various sizes of drills.

Referring now to FIG. 1, the dust guard 2 of the invention removably attaches to the stationary housing front end 16 of a conventional portable drill 1. The drill and its housing are shown for illustration and do not constitute part of the invention.

The dust guard 2 is comprised of an axially compressible elastic cylindrical body which may have a helical spring within a plastic coating. A first terminal annular portion 3 is affixed to one end of the body 4. It is composed of a soft plastic for forcing against a workpiece to be drilled without marring the surface. It engages the workpiece surface and thereby forms a sealed chamber around the drill bit (hidden from view) to retain any dust and debris from the drilling operation. Ventilation holes 8 may be provided to prevent pressure changes within the sealed chamber.

An annular second terminal portion 5 is affixed to the other end of the body 4. This is a resilient plastic sleeve arranged to removably slide onto the stationary nose end 16 of the drill housing to hold the dust guard in place and seal the end of the chamber formed by the guard against the workpiece.

The terminal portion 5 is provided with external screw threads 9. A set of adapters 6, 12-15 are provided for enabling the dust guard to be fitted to drills having a front end 16 too large to fit into terminal portion 5. Each of the adapters is provided with an internal screw thread 10 as shown in partially broken away adapter 6. Adapter 6 screws onto terminal portion 5 to provide a larger inside diameter. Adapter 12 screws onto the threads 11 of adapter 6 to provide an even larger inside diameter for engaging drills having a still greater range of diameters at their front end. The set of adapters progresses to the largest 15 which does not have external threads.

When the guard 2 is in position on drill i and first terminal portion is pressed against the surface of the workpiece, it forms a resilient seal. The drill is pressed against the workpiece and the body 4 compresses as the drill bit cuts into the workpiece. The cutting debris is contained within the body 4.

When the bit is withdrawn from the work, the body elastically returns to its full length.

The above disclosed invention has a number of particular features which should preferably be employed in combination although each is useful separately without departure from the scope of the invention. While t have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A dust guard for removably attaching to the stationary housing of a drilling machine and encircling a drill bit operated thereby, the dust guard comprising:
    A) an elongate, axially compressible, elastic cylindrical body, having a first end and a second end;
    B) a resilient, annular first terminal portion connected to said first end for non-marring engagement of a workpiece to be drilled;
    C) a resilient, annular second terminal portion connected to said second end, said second terminal portion arranged for removably engaging drill housings having a first diametral range;
    D) at least one adapter removably connectable by connecting means to said second terminal means, said adapter being resilient and annular and arranged for engaging drill housings having a diametral range other than said first diametral range, in which said connecting means comprises screw threads.

2. The dust guard according to claim 1, further comprising at least one radially directed aperture means in said first terminal portion for ventilation of said guard.

* * * * *